United States Patent
Lo et al.

(10) Patent No.: US 8,838,884 B2
(45) Date of Patent: Sep. 16, 2014

(54) FLASH MEMORY DEVICE AND DATA PROTECTION METHOD THEREOF

(75) Inventors: Chun-Yi Lo, New Taipei (TW); Hsu-Ping Ou, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 209 days.

(21) Appl. No.: 13/453,452

(22) Filed: Apr. 23, 2012

(65) Prior Publication Data
US 2012/0271986 A1    Oct. 25, 2012

(30) Foreign Application Priority Data
Apr. 25, 2011   (TW) .............................. 100114230 A

(51) Int. Cl.
   *G06F 12/00*  (2006.01)
   *G06F 12/02*  (2006.01)
   *G06F 12/14*  (2006.01)
(52) U.S. Cl.
   CPC ............ *G06F 12/14* (2013.01); *G06F 12/0246* (2013.01); *G06F 2212/1052* (2013.01); *G06F 2212/202* (2013.01)
   USPC ......................................................... 711/103
(58) Field of Classification Search
   CPC combination set(s) only.
   See application file for complete search history.

(56) References Cited

U.S. PATENT DOCUMENTS

| | | | |
|---|---|---|---|
| 6,009,495 A * | 12/1999 | DeRoo et al. ................. | 711/103 |
| 7,574,554 B2 | 8/2009 | Tanaka et al. | |
| 7,890,726 B1 | 2/2011 | Falik et al. | |
| 8,560,760 B2 * | 10/2013 | Dhokia et al. ................ | 711/103 |
| 2004/0199743 A1 | 10/2004 | Loaiza et al. | |
| 2008/0162359 A1 | 7/2008 | Kim et al. | |
| 2010/0057978 A1 | 3/2010 | Takamura et al. | |
| 2010/0115184 A1 | 5/2010 | Chang | |
| 2010/0169221 A1 | 7/2010 | Ahn et al. | |

FOREIGN PATENT DOCUMENTS

JP      2005-267163 A      9/2005

OTHER PUBLICATIONS

Office Action of corresponding TW application, published on Jun. 20, 2014.

* cited by examiner

*Primary Examiner* — Brian Peugh
(74) *Attorney, Agent, or Firm* — Wang Law Firm, Inc.; Li K. Wang; Stephen Hsu

(57) ABSTRACT

A data protection method for a flash memory device. In one embodiment, the flash memory device comprises a flash memory for storing protected data. After the flash memory device is coupled to a host, a plurality of current read addresses of a plurality of read commands sent from the host to the flash memory device are recorded. The current read addresses are then compared with a plurality of predetermined read addresses. When the current read addresses are not identical to the predetermined read addresses, the flash memory device is made to enter a data protection mode. When the flash memory device is in the data protection mode, if the flash memory device receives a plurality of data access commands, the data access commands are processed according to a protection mode setting parameter to prevent the protected data from being accessed by the host.

14 Claims, 7 Drawing Sheets

| Data protection mode parameter | | | | | | | |
|---|---|---|---|---|---|---|---|
| Byte 0 | Byte 1 | Byte 2 | Byte 3 | Byte 4 | Byte 5 | Byte 6 | Byte 7 |
| Protection mode initialization parameter | Protection mode setting parameter | Read address setting parameter | Read count parameter | Reserved | Reserved | Reserved | Reserved |

| Read address setting parameter | Predetermined address table | | | | | | | | | |
|---|---|---|---|---|---|---|---|---|---|---|
| | Predetermined read address | | | | | | | | | |
| | 1 | 2 | 3 | 4 | 5 | 6 | 7 | 8 | 9 | 10 |
| 0x01 | $A_{11}$ | $A_{12}$ | $A_{13}$ | $A_{14}$ | $A_{15}$ | $A_{16}$ | $A_{17}$ | $A_{18}$ | $A_{19}$ | $A_{10}$ |
| 0x02 | $A_{21}$ | $A_{22}$ | $A_{23}$ | $A_{24}$ | $A_{25}$ | $A_{26}$ | $A_{27}$ | $A_{28}$ | $A_{29}$ | $A_{20}$ |
| 0x03 | $A_{31}$ | $A_{32}$ | $A_{33}$ | $A_{34}$ | $A_{35}$ | $A_{36}$ | $A_{37}$ | $A_{38}$ | $A_{39}$ | $A_{30}$ |
| ...... | ...... | ...... | ...... | ...... | ...... | ...... | ...... | ...... | ...... | ...... |
| 0xFF | | | | | | | | | | |

FLASH MEMORY DEVICE AND DATA PROTECTION METHOD THEREOF

CROSS REFERENCE TO RELATED APPLICATIONS

This Application claims priority of Taiwan Patent Application No. 100114230, filed on Apr. 25, 2011, the entirety of which is incorporated by reference herein.

BACKGROUND OF THE INVENTION

1. Field of the Invention

The invention relates to flash memories, and more particularly to data protection of flash memories.

2. Description of the Related Art

A flash memory device comprises a flash memory which stores data for a host. Many software programs, such as audio files and video files, are downloaded from a website and must be stored in a flash memory device. A legal user paying money for the downloaded program may store the downloaded program in an authorized flash memory device. An illegal user who does not pay money for the downloaded program may also copy the downloaded program from an authorized flash memory device to an unauthorized flash memory device and then illegally uses the downloaded program, and a loss by a developer of the downloaded program is therefore induced. Thus, a data protection method is required to prevent protected data from being copied to an unauthorized flash memory device.

BRIEF SUMMARY OF THE INVENTION

The invention provides a data protection method for a flash memory device. In one embodiment, the flash memory device comprises a flash memory for storing protected data. After the flash memory device is coupled to a host, a plurality of current read addresses of a plurality of read commands sent from the host to the flash memory device are recorded. The current read addresses are then compared with a plurality of predetermined read addresses. When the current read addresses are not identical to the predetermined read addresses, the flash memory device is made to enter a data protection mode. When the flash memory device is in the data protection mode, if the flash memory device receives a plurality of data access commands, the data access commands are processed according to a protection mode setting parameter to prevent the protected data from being accessed by the host.

The invention provides a flash memory device. In one embodiment, the flash memory device comprises a flash memory and a controller. The flash memory stores protected data, a plurality of predetermined read addresses, and a protection mode setting parameter. After the flash memory device is coupled to a host, the controller records a plurality of current read addresses of a plurality of read commands sent from the host to the flash memory device, compares the current read addresses with a plurality of predetermined read addresses, and when the current read addresses are not identical to the predetermined read addresses, makes the flash memory device to enter a data protection mode, and processes a plurality of data access commands received from the host according to a protection mode setting parameter to prevent the protected data from being accessed by the host.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2 shows a set of data protection parameters according to the invention;

FIG. 3B is a schematic diagram of a predetermined address table according to the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
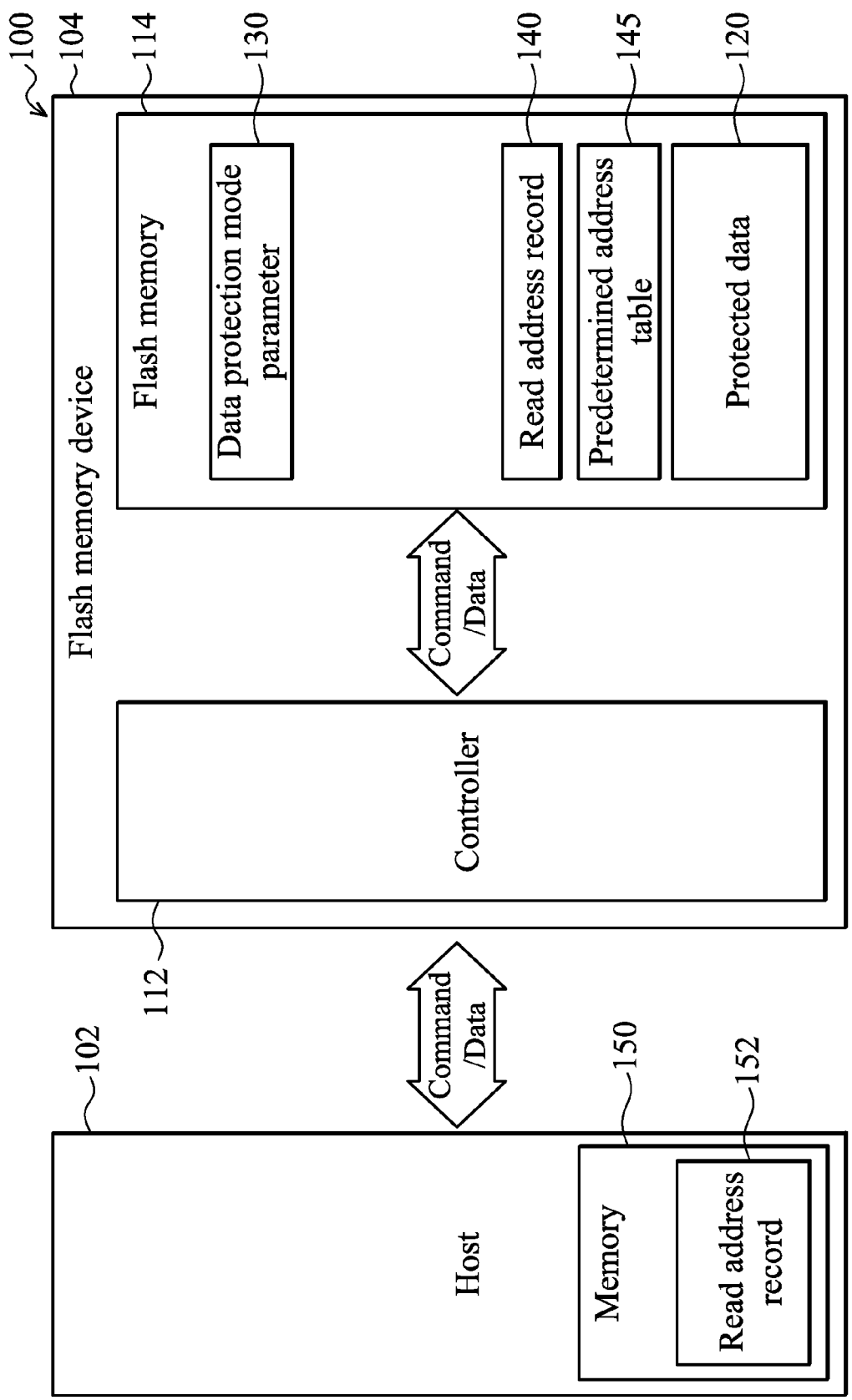
FIG. 1 is a block diagram of a flash memory device according to the invention.

Referring to FIG. 1, a block diagram of a flash memory device 104 according to the invention is shown. The flash memory device 104 is coupled to a host 102 and stores data for the host 102. In one embodiment, the flash memory device 104 comprises a controller 112 and a flash memory 114. Protected data 120 is stored in the flash memory 114. In one embodiment, the host 102 legally obtains the protected data 120 by paying money and then writes the protected data to the flash memory 114. In one embodiment, the host 102 comprises a memory 150. When the host 102 sends a read command to the flash memory device 104, the host 102 records a read address comprised by the read command in the memory 150 as a read address record 152. When the flash memory device 104 receives a read command from the host 102, the controller 112 records the read address comprised by the read command in the flash memory 114 as the read address record 140.

In addition to the host 102, the flash memory device 104 may also be coupled to another host. To avoid the protected data 120 stored in the flash memory device 104 from being accessed by another host, the flash memory device 104 determines whether a host coupled to the flash memory device 104 is the host 102. Illegal hosts therefore cannot access the protected data stored in the flash memory device 104 to avoid loss by a developer of the protected data. In a data protection mode, when a host coupled to the flash memory device 104 is identified to be the host 102, the controller 112 lets the host 102 access the protected data 120. If the host coupled to the flash memory device 104 is determined to not be the host 102, the controller 112 denies access requests of the protected data 120 from the host.

When the host 102 decouples from the flash memory device 104, the host 102 and the flash memory device 104 respectively store the read address records 152 and 140. When the flash memory device 104 is coupled to a current host again, the controller 112 of the flash memory device 104 must determine whether the current host is the host 102 as a reference for determining whether the current host is allowed to access the protected data 120. If the current host is the host 102, the host 102 sends a series of read commands to the flash memory device 104, wherein the series of read commands respectively comprise the read addresses recorded in the read address record 152. In one embodiment, the number of the read commands is determined according to a read count parameter. When the flash memory device 104 receives the read commands, the controller 112 compares the read addresses comprised by the read commands with the predetermined read addresses stored in the read address record 140. If the read addresses are identical to the predetermined read addresses, the controller 112 determines that the current host is the host 102. If the read addresses are not identical to the predetermined read addresses, the controller 112 determines that the current host is not the host 102.

When the current host is determined to be the host 102, the controller 112 allows the host 102 to access the protected data 120. When the current host is determined to not be the host 102, the protected data 120 is prevented from being accessed by the current host. In one embodiment, the when the current host is determined to not be the host 102, if the controller 112 receives a plurality of data access commands from the current host, the controller 112 processes the data access commands according to the data protection setting parameter. In one embodiment, when the controller 112 receives the data access commands, the controller 112 erases the protected data 120 from the flash memory device 104. In another embodiment, when the controller 112 receives data access commands from the current host, the controller 112 sends a random code back to the current host in response to the data access commands. In another embodiment, when the controller 112 receives the access commands, the controller 112 normally executes read commands of the data access commands, and ignores the write commands of the data access commands.

Because operation of the data protection mode needs a plurality of parameters, a set of data protection mode parameters 130 is stored in a specific address of the flash memory device 114. In one embodiment, the data protection mode parameter 130 is stored at a logical block address 0 of the flash memory 114. Referring to FIG. 2, a set of data protection parameters 200 according to the invention is shown. In one embodiment, the data protection mode parameter 200 comprises 8 bytes of data. A first byte of the data protection mode parameter 200 is a protection mode initialization parameter for indicating whether the flash memory device 104 is operated according to the data protection mode. When the flash memory device 104 does not operate according to the data protection mode, the controller 112 does not determine whether the current host coupled to the flash memory device 104 is the original host 102 and normally processes the data access commands sent from the current host.

A second byte of the data protection mode parameter 200 is a protection mode setting parameter for setting a method for processing data access commands sent from a current host which is determined to not be the legal host 102. A third byte of the data protection mode parameter is a read address setting parameter indicating the predetermined addresses to be compared with the read addresses sent by the current host. In one embodiment, a predetermined address table 145 recording a plurality of the predetermined addresses is stored in the flash memory 114. The controller 112 can select a set of predetermined addresses to be compared with the read addresses sent from the current host. The fourth byte of the data protection mode parameter 200 is a read count parameter indicating the number of read commands and read addresses to be compared with the predetermined addresses. The fifth, sixth, and seventh bytes of the data protection read parameter 200 is reserved for future use. The eighth byte of the data protection mode parameter is a checksum.

Figure 3A:
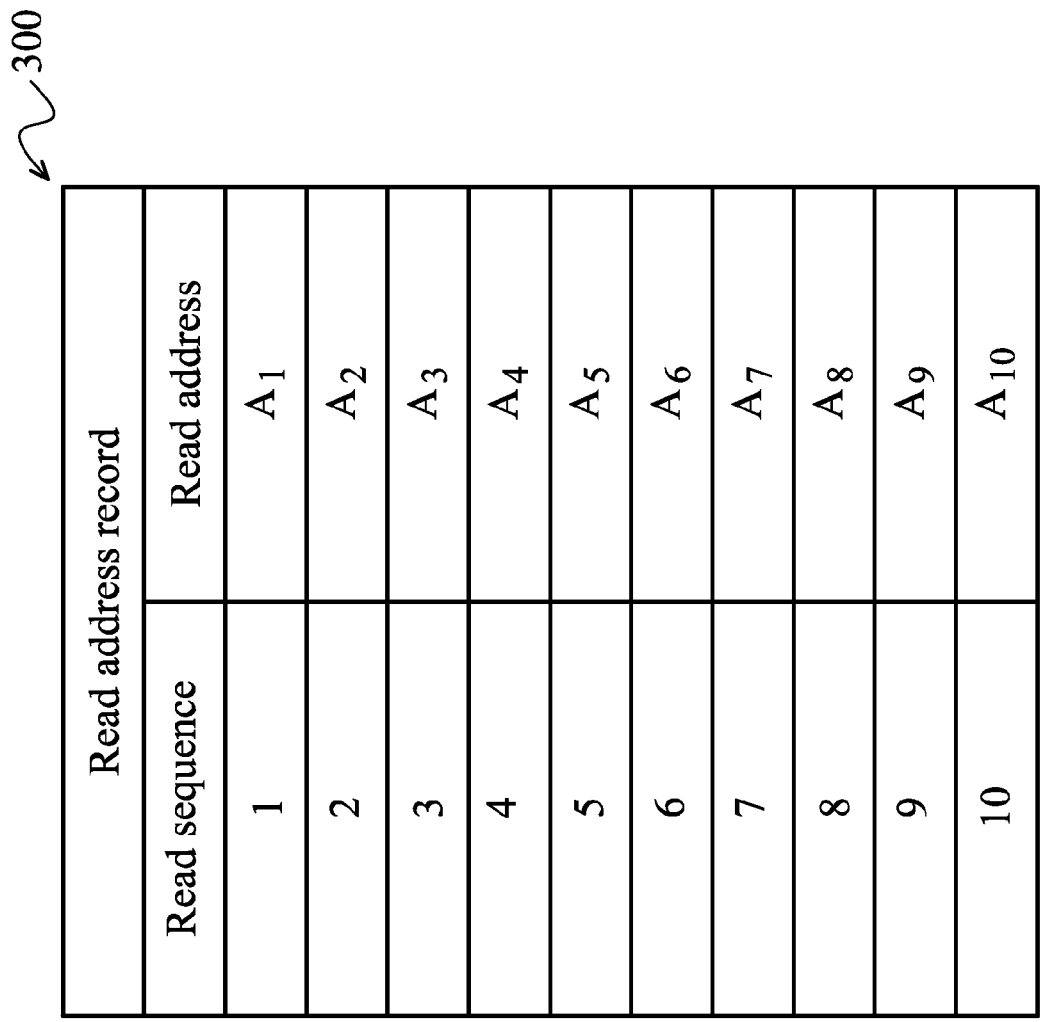
FIG. 3A is a schematic diagram of a read address record according to the invention.

Referring to FIG. 3A, a schematic diagram of a read address record 300 according to the invention is shown. When the flash memory device 104 receives a read command from the host 102, the controller 112 records the read address comprised by the read command in the read address record 300. If the read count parameter is equal to 10, the read address record 300 only keeps 10 read addresses $A_1 \sim A_{10}$. Referring to FIG. 3B, a schematic diagram of a predetermined address table 350 according to the invention is shown. The predetermined address table 350 comprises a plurality of sets of predetermined read addresses, and each set of the predetermined read addresses corresponds to a value of the read address setting parameter. Assume that the read address setting parameters has a value range from 0x00 to 0xFF. The predetermined address table 350 then comprises a plurality of sets of predetermined read addresses respectively corresponding to values 0z01~0xFF. For example, the set of predetermined read addresses corresponding to the value 0x01 of a read address setting parameter are $A_{11}, A_{12}, A_{13}, \ldots, A_{19}$, and $A_{10}$, and the set of predetermined read addresses corresponding to the value 0x03 of a read address setting parameter are $A_{31}, A_{32}, A_{33}, \ldots, A_{39}$, and $A_{30}$.

Figure 4A:
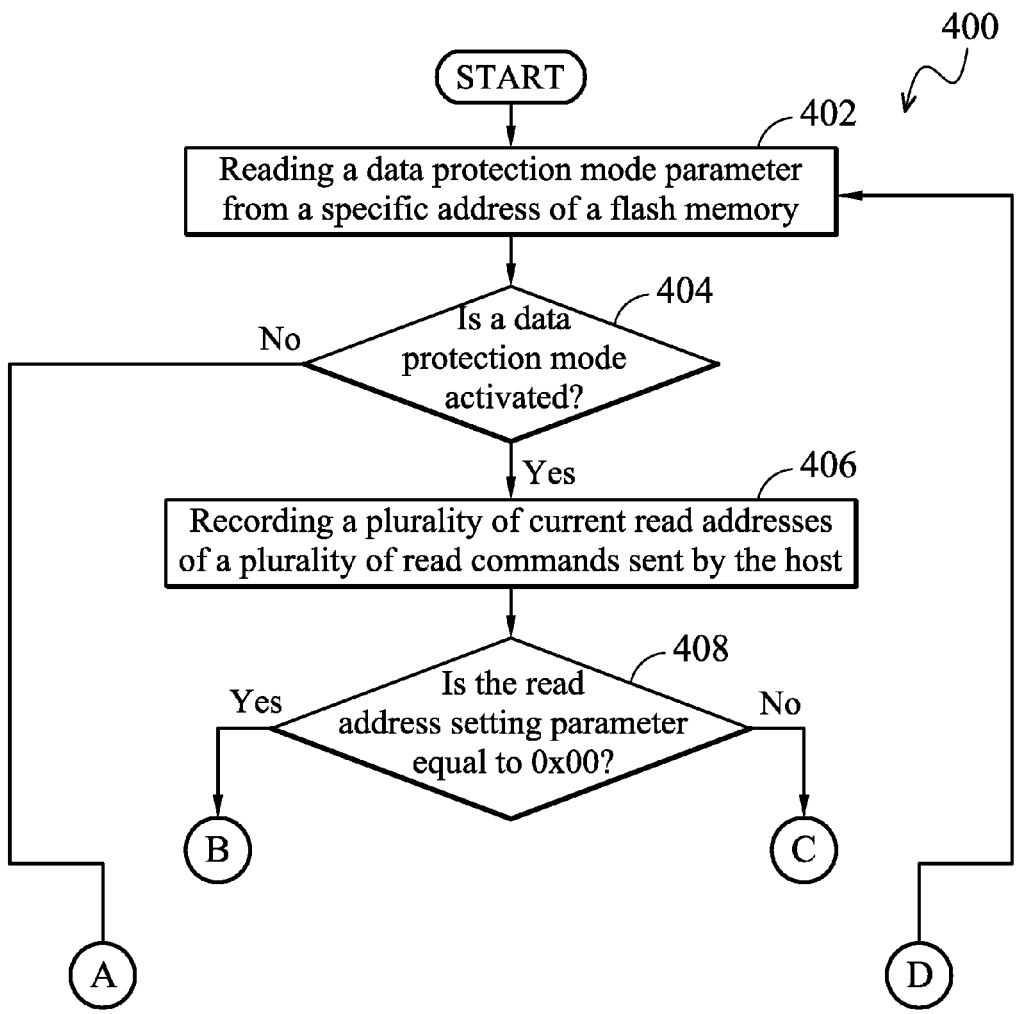
FIG. 4 is a flowchart of a data protection method for a flash memory device according to the invention.
Figure 4B:
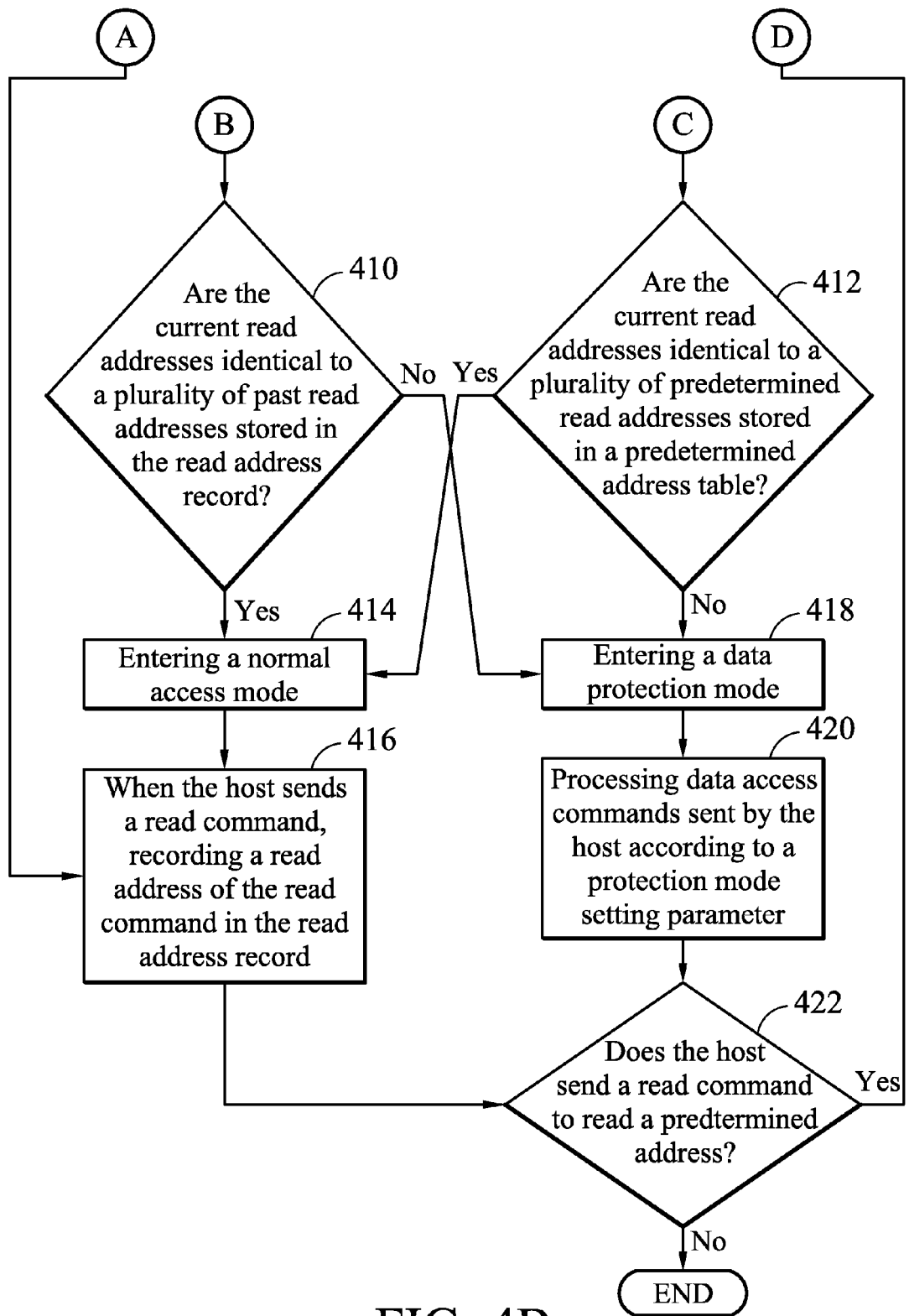

Referring to FIG. 4, a flowchart of a data protection method 400 for a flash memory device 104 according to the invention is shown. When the power of the flash memory device 104 is turned on, the controller 112 first reads a data protection mode parameter from a specific address of a flash memory 114 (step 402). The controller 112 then determines whether a data protection mode is activated according to the protection mode activation parameter comprised by the data protection mode parameter (step 404). If not, the controller 112 normally processes data access commands. If the data protection mode is activated, after the host 102 is coupled to the flash memory device 104, the controller 112 records a plurality of current read addresses comprised by a plurality of read commands sent by the host 112 (step 406). For example, if the read count parameter is equal to 10, the controller 112 sequentially records 10 current read addresses of 10 read commands sent by the host 102.

The controller 112 then reads the read address setting parameter comprised by the read data protection mode parameter 130 (step 408). If the value of the read address setting parameter is 0x00, the controller 112 compares a plurality of past read addresses stored in the read address record 140 with a plurality of current read addresses sent by the host 102 to identifies the host 102 (step 410). When the value of the read address setting parameter is not 0x00, the controller 112 selects a predetermined read addresses from the predetermined address table 145 and compares the predetermined read addresses with a plurality of current read addresses sent by the host 102 to identifies the host 102 (step 412).

When the comparison result of steps 410 and 412 indicates that the current read addresses are identical to the past read addresses or the predetermined read addresses, the flash memory device 104 enters a normal access mode (step 414). When the flash memory device 112 receives data access commands from the host 102, the controller 112 normally processes the data access commands. When the host 102 sends read commands to the flash memory device 104, the controller 112 writes the read addresses comprised by the read commands to the read address record 140 for future comparison (step 416). When the comparison result of steps 410 and 412 indicates that the current read addresses are not identical to the past read addresses or the predetermined read addresses, the flash memory device 104 enters a data protection mode (step 418). According to the data protection mode, when the host 102 sends data access commands to the flash memory device 104, the controller 112 reads a protection mode setting parameter of the data protection mode parameter 130, and then processes the data access commands according to the protection mode setting parameter (step 420). The processing of the data access commands according to the protection mode setting parameter under a data protection mode is further illustrated in detail in FIG. 5. Finally, if the host sends a read command to the flash memory device 104 to read a predetermined address, the controller 112 returns to step 402 to execute the method 400 again (step 422).

Figure 5:
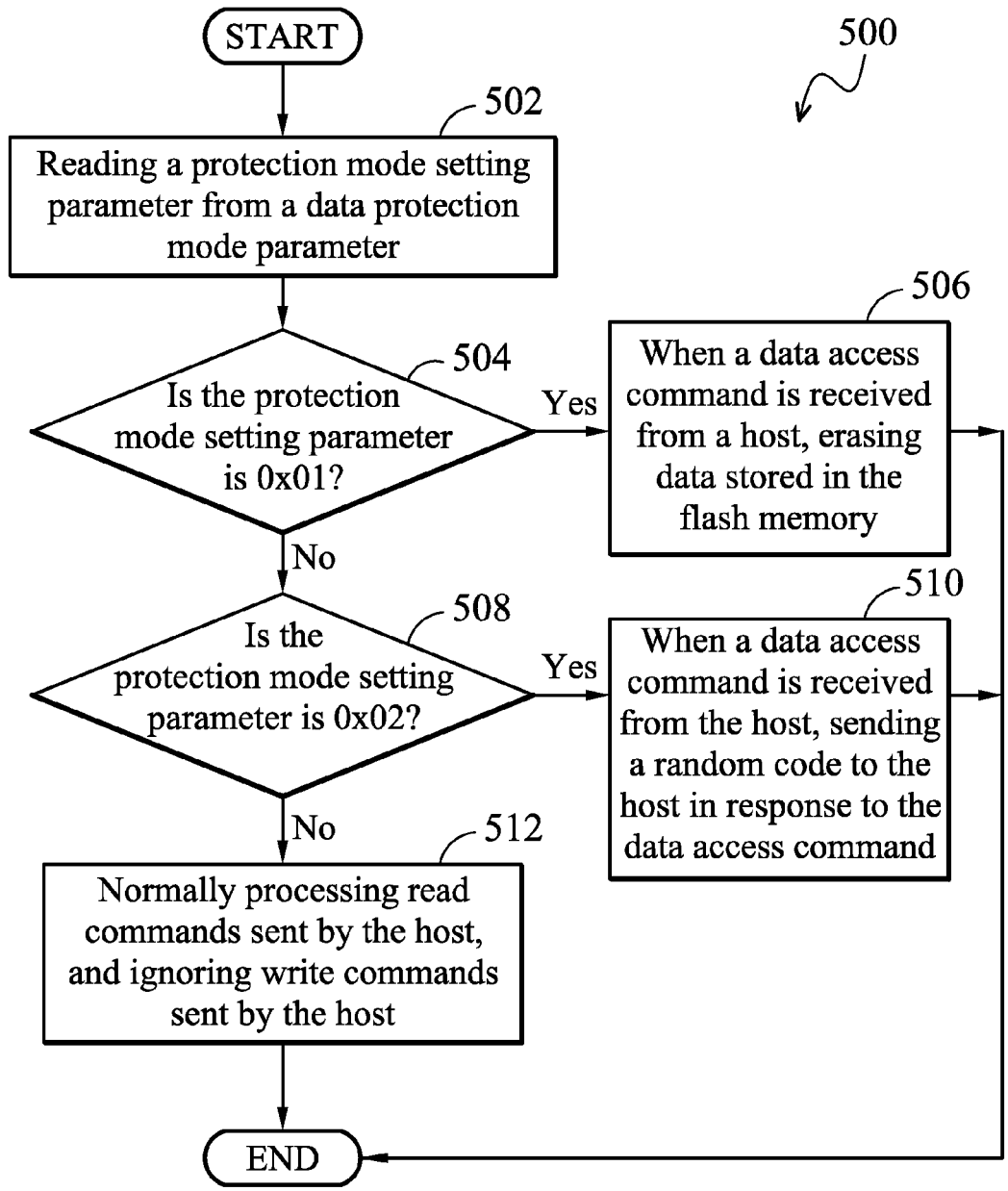
FIG. 5 is a flowchart of a method for processing data access commands under a data protection mode according to the invention.

Referring to FIG. 5, a flowchart of a method 500 for processing data access commands under a data protection mode according to the invention is shown. First, the controller 112 reads a protection mode setting parameter from a data protection mode parameter 130 (step 502). If the value of the protection mode setting parameter is equal to 0x01 (step 504), when the controller 112 receives a data access command from the host 102, the controller 112 erases the protected data 120 from the flash memory 114 to avoid the protected data 120 from being accessed by the host 102 (step 506). If the value of the protection mode setting parameter is equal to 0x02 (step 508), when the controller 112 receives a data access command from the host 102, the controller 112 sends a random code back to the host 102 in response to the data access command (step 510), and the protected data 120 is therefore not accessed by the host 102 according to the data access command. When the value of the protection mode setting parameter is not equal to 0x01 or 0x02, when the controller 112 receives a data access command from the host 102, the controller 112 normally processes the data access command if the data access command is a read command, and the controller 112 ignores the data access command if the data access command is a write command (step 512).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data protection method for a flash memory device, wherein the flash memory device comprises a flash memory for storing protected data, the data protection method comprising:
   after the flash memory device is coupled to a host, recording a plurality of current read addresses of a plurality of read commands sent from the host to the flash memory device;
   comparing the current read addresses with a plurality of predetermined read addresses;
   when the current read addresses are not identical to the predetermined read addresses, making the flash memory device to enter a data protection mode; and
   when the flash memory device is in the data protection mode, if the flash memory device receives a plurality of data access commands, processing the data access commands according to a protection mode setting parameter to prevent the protected data from being accessed by the host.

2. The data protection method as claimed in claim 1, wherein a plurality of data protection mode parameters are stored in a specific address of the flash memory, and the data protection mode parameters comprise the protection mode setting parameter, a read address setting parameter, and a read count parameter, wherein the predetermined read addresses are stored in the read address setting parameter, and the number of the predetermined read addresses is stored as the read count parameter.

3. The data protection method as claimed in claim 2, wherein when the read address setting parameter is 0x00, the predetermined read addresses are a plurality of past read addresses comprised by a plurality of past read commands received by the flash memory device before the power supply of the flash memory device is turned off.

4. The data protection method as claimed in claim 2, wherein a plurality of addresses are stored according to the read address setting parameter in a predetermined address table, and when the read address setting parameter is not 0x00, the predetermined read address is selected from the addresses of the predetermined address table according to the read address setting parameter.

5. The data protection method as claimed in claim 1, wherein processing of the data accessing commands comprises:
   if the protection mode setting parameter is 0x01, when the flash memory device receives the data access commands from the host, erasing the protected data from the flash memory; and
   if the protection mode setting parameter is 0x02, when the flash memory device receives the data access commands from the host, sending a random code by the flash memory device to the host.

6. The data protection method as claimed in claim 5, wherein processing of the data accessing commands further comprises:
   if the protection mode setting parameter is 0x03, executing read commands comprised by the data access commands and ignoring write commands comprised by the data access commands.

7. The data protection method as claimed in claim 1, wherein the data protection method further comprises:
   before the flash memory device is decoupled from the host, making the flash memory device to sequentially record a plurality of previous read commands received from the host as the predetermined read addresses; and
   before the flash memory device is decoupled from the host, making the host to sequentially record the previous read commands sent to the flash memory device as the current read addresses sent to the flash memory device.

8. A flash memory device, comprises:
   a flash memory, storing protected data, a plurality of predetermined read addresses, and a protection mode setting parameter; and
   a controller, after the flash memory device is coupled to a host, recording a plurality of current read addresses of a plurality of read commands sent from the host to the flash memory device, comparing the current read addresses with a plurality of predetermined read addresses, and when the current read addresses are not identical to the predetermined read addresses, making the flash memory device to enter a data protection mode, and processing a plurality of data access commands received from the host according to a protection mode setting parameter to prevent the protected data from being accessed by the host.

9. The flash memory device as claimed in claim 8, wherein a plurality of data protection mode parameters are stored in a specific address of the flash memory, and the data protection mode parameters comprise the protection mode setting parameter, a read address setting parameter, and a read count parameter, wherein the predetermined read addresses are stored in the read address setting parameter, and the number of the predetermined read addresses is stored as the read count parameter.

10. The flash memory device as claimed in claim 9, wherein when the read address setting parameter is 0x00, the predetermined read addresses are a plurality of past read addresses comprised by a plurality of past read commands received by the flash memory device before the power supply of the flash memory device is turned off.

11. The flash memory device as claimed in claim 9, wherein a plurality of addresses are stored according to the read address setting parameter in a predetermined address table, and when the read address setting parameter is not 0x00, the predetermined read address is selected from the addresses of the predetermined address table according to the read address setting parameter.

12. The flash memory device as claimed in claim 8, wherein when the controller processes the data access commands according to the protection mode setting parameter, the controller erases the protected data from the flash memory if the protection mode setting parameter is 0x01, and the controller sends a random code to the host if the protection mode setting parameter is 0x02.

13. The flash memory device as claimed in claim 12, wherein when the controller processes the data access commands according to the protection mode setting parameter, the controller executes read commands comprised by the data access commands and ignores write commands comprised by the data access commands if the protection mode setting parameter is 0x03.

14. The flash memory device as claimed in claim 8, wherein before the flash memory device is decoupled from the host, the flash memory device sequentially records a plurality of previous read commands received from the host as the predetermined read addresses, and the host sequentially records the previous read commands sent to the flash memory device as the current read addresses sent to the flash memory device.

* * * * *